Dec. 28, 1943.  R. D. ACTON  2,337,728
AIR CLEANER
Filed Feb. 24, 1941  2 Sheets-Sheet 1

Inventor
Russel D. Acton
By Paul O. Pippel
Atty.

Dec. 28, 1943.   R. D. ACTON   2,337,728
AIR CLEANER
Filed Feb. 24, 1941   2 Sheets-Sheet 2
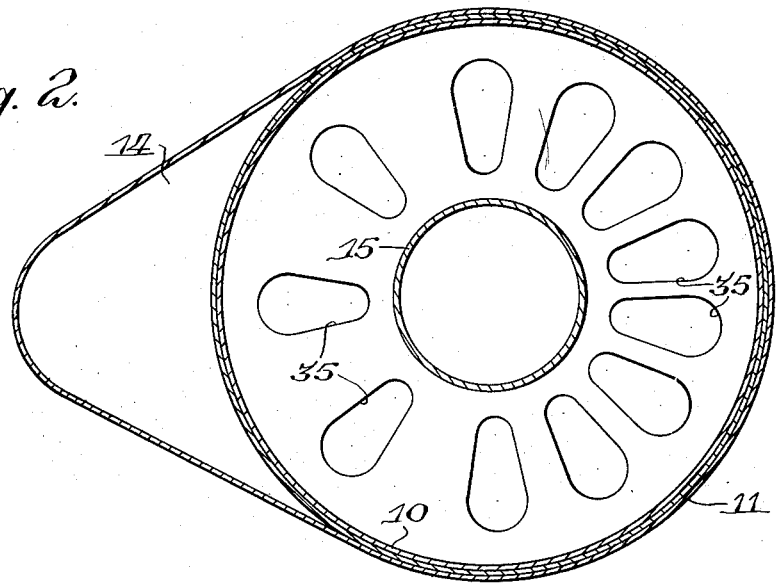
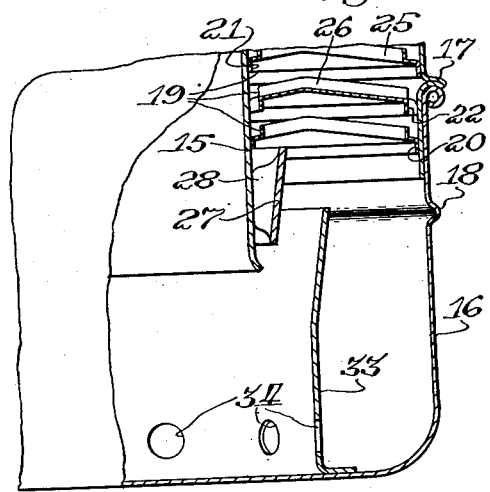
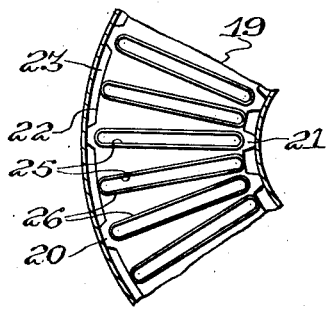
Inventor
Russel D. Acton
By Paul O. Pippel
Atty Patented Dec. 28, 1943

2,337,728

UNITED STATES PATENT OFFICE 2,337,728

AIR CLEANER

Russel D. Acton, Chicago, Ill., assignor to International Harvester Company, a corporation of New Jersey Application February 24, 1941, Serial No. 380,301

6 Claims. (Cl. 183—26)

This invention relates to an air cleaner. More specifically, it relates to an air cleaner of the liquid contact type commonly known as the oil bath type.

In the use of air cleaners for internal combustion engines it has been found necessary to use a liquid wetted contact surface in order to obtain the necessary effectiveness in removing the fine particles of dust. In cleaners of this type oil is usually mixed with the air stream prior to its contact with a filter medium such as crimped wire wool or perforated screens. In cleaners of this type one of the difficulties which has been encountered is the distribution of the oil throughout the contact material. It is desirable to maintain a sufficient amount of liquid in all parts of the contact material to obtain an effective separation of the dust from the air. At the same time, it is essential that the oil which is carried up with the air stream be separated out of the air stream and returned to the reservoir or to additional incoming air.

The object of the present invention is to provide an improved air cleaner of the liquid contact type in which oil-return means are provided for returning a portion of the liquid at one location with respect to the air stream and a second portion of the liquid to another location with respect to the air stream.

Another object is to provide in an air cleaner a liquid separation and return means for continuously removing liquid from the air stream at one location and delivering the liquid to opposite sides of an incoming air stream.

Another object is to provide a baffle, or separator element, which is provided with means for delivering deflected or separated liquid in two opposite directions.

The above defined objects and others relating to constructional details will be apparent from the description to follow.

In the drawings,

Figure 2 is a horizontal section taken on the line 2—2 of Figure 1;

Figure 3 is a partial sectional view taken on the line 3—3 of Figure 1;

Figure 4 is a sectional view similar to the lower portion of Figure 1 showing a modified form of the device.

Figure 1:
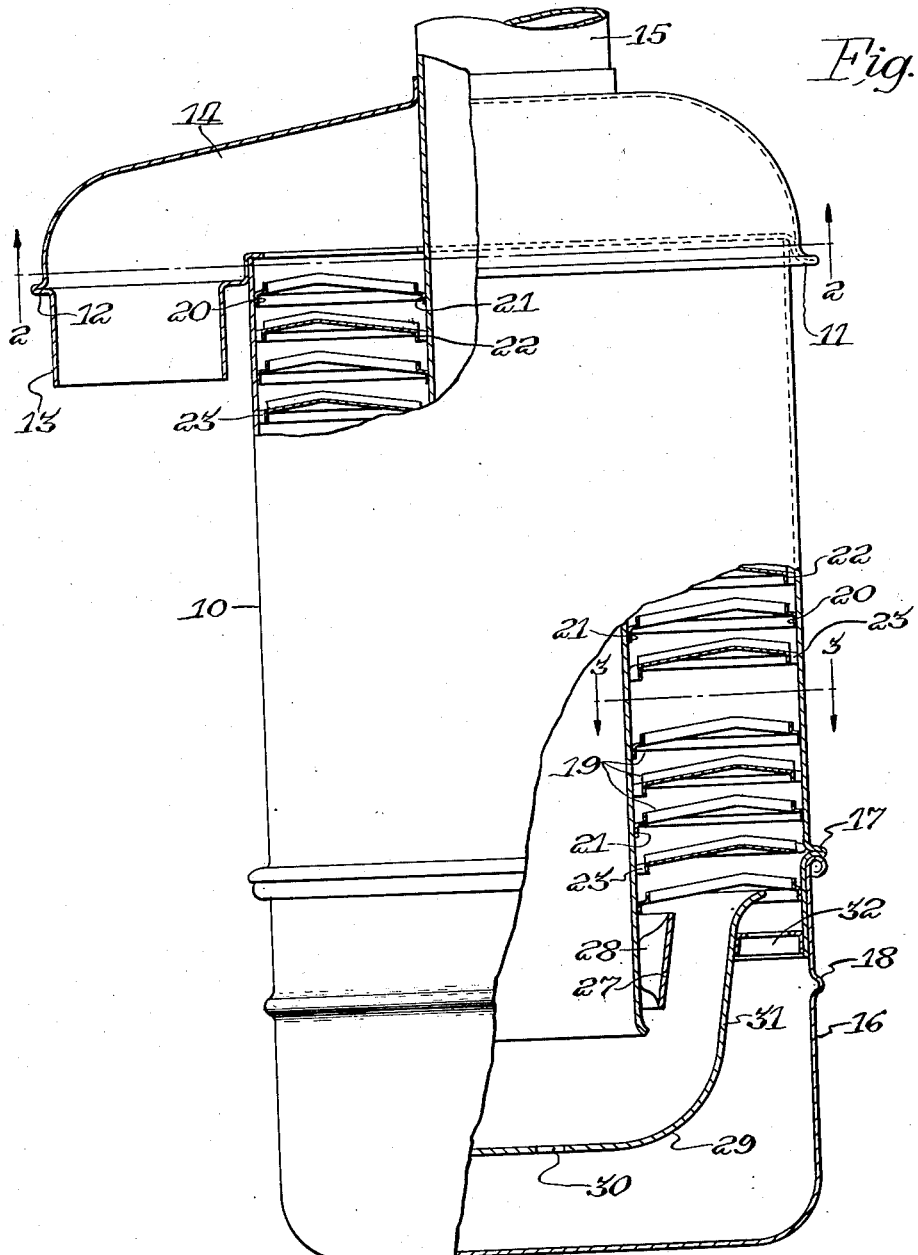
Figure 1 is a side elevation of an air cleaner embodying the invention with two portions broken away to show the internal construction at the bottom of the cleaner and at the top adjacent the outlet.

The drawings illustrate a cleaner of a type widely used for tractor engines. A cylindrical casing 10, open at its bottom end, is secured at the top to a member 11 having an extension 12 at one side of the casing. A cylindrical depending sleevelike portion 13 of the extension 12 provides means for attaching an outlet conduit which normally is connected to the carburetor intake of the engine. A cover 14 is secured to the member 11 providing an outlet at the top of the casing. An inlet tube 15 extends through an opening in the top of the cover 14 and centrally through the casing concentric with the vertical wall of the casing.

A cup 16 is secured to the open end bottom of the casing 10, being fitted against an annular flange 17 provided on the casing. Said cup may be secured in position by any conventional means, being removable for cleaning and filling with oil. A head 18 around the cup 16 indicates the normal liquid level.

A plurality of baffles 19 which provide oil intercepting, deflecting, and collecting means, are mounted in the annular space between the vertical wall of the casing and the inlet tube 15. Said baffles are annular in shape, each being provided with a down-turned outer flange 20 and down-turned inner flange 21. Such flanges are intermittently spaced from the inlet tube, as shown at 22, and spaced from the casing wall, as shown at 23, to form liquid-return passages 24 at both the inner and outer edges of the baffle. Each baffle is provided with a plurality of radial slits 25 surrounded by upturned walls 26. The spaced walls and the portions of the baffle between the walls form channels in which separated oil may flow out of the direct path of the air stream. This type of baffle is shown in the Baker et al. Patent 2,199,019. In said patent the baffles are conical, extending in one direction only. In the device constituting this invention the baffles slope in two directions from an intermediate point whereby a portion of the separated liquid is delivered in each direction. In the device shown in Figures 1, 2, and 3 the divide in the arched baffles is closer to the wall of the casing than to the inlet tube. Providing the separation of oil was equal over the entire area of the baffle in this construction, a larger amount of liquid would be delivered adjacent the air inlet tube than to the wall of the casing. The exact location of the divide in the baffle members depends upon the characteristics of the particular cleaner and the relation between the amount of oil desired at the inner and outer walls.

Adjacent the inlet tube 15 near the bottom thereof, an annular member 27 is secured in spaced relation by means of indented portions 28 which may be welded or otherwise secured to the air inlet tube. This member provides end channels protected from high velocity air flow through which oil collected adjacent the air inlet tube can flow downwardly into the inner side of the incoming air stream as it turns from the bottom of the air inlet tube and flows upwardly toward the contact material. The bottom of the air inlet tube 15 is slightly flared outwardly to provide an area of somewhat lower pressure adjacent the discharge end of the liquid flow conduit provided by the member 27 and the inlet tube 15.

A deflector 29 is mounted in the casing at the bottom of the air inlet tube, being spaced therefrom to provide a passage for the flow of air. Said member has a flat bottom provided with an inlet opening 30 through which oil is delivered to the incoming air stream. A member is also provided with an upwardly extending wall 31 bent outwardly towards the outer wall of the casing at its upper end for smooth flow of air into the filtering zone of the cleaner. The wall 31 extends not only above the static liquid level in the cleaner, but also above the maximum height reached by the liquid during operating conditions, so that no oil flows into the air stream over the top of the wall. The member 29 is held in position by brackets 32 extending to the lower end of the casing wall.

The liquid flow adjacent the air inlet tube 15 has already been described. In addition to this oil return to the air stream, oil is at all times flowing into the air stream through the opening 30 in the member 29. This construction permits introduction of liquid at two points in the air stream and assures thorough mixing. It is particularly important to deliver liquid to the air stream adjacent the bottom of the air inlet tube, as liquid delivered at this point tends to fall through the air stream whereby there is a better opportunity for its being entrained in the air stream than liquid flowing through an inlet in a baffle wall such as the opening 30. The major portion of the liquid inserted in this manner tends to stay on the outside of the air stream whereby it is not uniformly distributed throughout the contact material.

In the operation of the cleaner, the oil delivered to the casing wall flows downwardly back into the oil reservoir formed by the cup 16 whereby the static condition of the oil permits the dirt to settle out before the oil is delivered back into the air stream through the openings 30.

Figure 4 shows a modified construction at the bottom of the casing. In this construction a substantially cylindrical baffle member 33 is secured directly to the bottom of the oil cup 16 extending upwardly somewhat at an angle in an outward direction and terminating substantially at the normal static liquid level. This construction is shown in the Lowther Patent 2,000,706. The functioning here is somewhat different than in the modification first described. As the baffle 33 is lower than the operating oil level, oil returning adjacent the casing wall builds up and overflows the top of the baffle 33 into the incoming air stream. By the arched baffle construction, oil is also returned by positive flow means to the inlet tube and delivered downwardly whereby said liquid is discharged into the incoming air stream adjacent the air inlet tube. By means of arched baffles having oil conducting channels formed thereon, a positive separation of the oil can be attained whereby the required amount may be delivered to the air inlet tube and to the outer wall of the casing. It will be noted in this construction that the divide in the baffles is shown closer to the inlet tube than to the casing wall. The exact location of this divide depends upon the characteristics of the particular cleaner and provides a means whereby a cleaner can be constructed to deliver the most effective amount of oil to the air stream at the desired location.

Openings 34 may be provided in the lower portion of the baffle 33 to deliver oil to the space within the member. The size and number of these openings depend upon the amount of oil which is to be added to the inside of the baffle relative to the amount which is to overflow the top of the baffle.

As shown in Figure 2, the member 11 at the top of the casing is provided with a plurality of outlet openings 35. It will be noted that these openings are spaced relatively far apart adjacent the outlet side of the cover 14, and that they are spaced progressively closer together at the opposite side of the cover. As above pointed out, the distribution of the oil in a cleaner of this type is a significant element in the functioning of the cleaner. It is desirable to carry the oil as high up in the cleaner as possible in order to sustain the cleaning action up to the time the air is discharged from the cleaner. For this reason, an effective oil-separating and returning means is necessary to obtain the maximum cleaning of the air. It is, however, a very important consideration to separate out all of the oil before the air is discharged, as otherwise oil is carried over into the engine depleting the supply of oil in the reservoir of the cleaner. It has been found that if an opening of uniform cross section is provided around the top of an annular cleaner with an outlet located at one side, the air tends to take the most direct route with the result that the velocity is increased adjacent the discharge opening tending to carry oil over and out of the cleaner. At the same time, a more static condition of flow results in the section of the cleaner farthest away from the outlet. This necessitates more separating elements and at increased height in the cleaner as it is not equally effective around the entire annular area. To overcome this objection and to obtain a more even distribution of air flow and oil separation, openings as shown in Figure 2 have been provided. By means of such openings the resistance to air flow is substantially equal at all points around the annular casing. This construction gives a uniform oil and air flow and oil separation up to the discharge of the air from the casing.

It is understood that applicant has shown and described only two preferred embodiments of his improved air cleaner construction, but that he claims as his invention all modifications falling within the scope of the appended claims.

What is claimed is:

1. An air cleaner comprising a cylindrical casing open at its lower end, an oil reservoir fitted over said lower end, a concentric air inlet tube terminating in the reservoir, and a series of spaced annular baffles mounted in the annular space between the air inlet tube and the casing, said baffles extending downwardly in two angular directions from the central portions thereof, portions of the lower edges of the baffles terminating in slightly spaced relation with respect to the casing to thereby form oil-return passages, and said baffles being formed with radial slits and with upturned flanges adjacent the slits at each side thereof to provide oil-return channels extending in both directions from the central portions.

2. An air cleaner comprising a casing having an oil reservoir at its lower end, a central air inlet conduit terminating in the reservoir, and a series of spaced baffles mounted in the space between the air inlet conduit and the casing, said baffles extending downwardly in two directions from the central portions thereof, portions of the lower edges of the baffles terminating in spaced relation with respect to the casing to form oil-return passages, and said baffles being formed with radial slits and with flanges adjacent the slits at each side thereof to provide oil-return means extending in both directions from the central portion.

3. In an air cleaner construction having an outer cylindrical casing provided with an air outlet at the top thereof, an inner central air inlet tube terminating above the bottom of the casing, the bottom of said casing adapted to form a liquid reservoir, and, in combination therewith, spaced annular contact elements extending between the air inlet tube and the casing wall, each of said elements being sloped downwardly in both directions from an intermediate zone and being formed with radial slits and upturned flanges adjacent to the slits to effect liquid conveying channels extending in both directions from said intermediate zone whereby liquid collected out of the air stream by said elements is delivered inwardly to the wall of the inlet tube and outwardly to the wall of the casing.

4. In an air cleaner construction having an outer cylindrical casing provided with an air outlet at the top thereof, an inner central air inlet tube terminating above the bottom of the casing, the bottom of said casing adapted to form a liquid reservoir, and in combination therewith, spaced annular contact elements extending between the air inlet tube and the casing wall, each of said elements being sloped downwardly in both directions from an intermediate zone and being formed with liquid conveying channels extending in both directions from said intermediate zone whereby liquid collected out of the air stream by said elements is delivered inwardly to the wall of the inlet tube and outwardly to the wall of the casing, and an annular member spaced around the bottom of the inlet tube extending upwardly to the contact elements to provide an oil return out of the flow of air adjacent the contact elements and into the flow of air at the bottom of the inlet tube.

5. An air cleaner comprising a cylindrical casing having an oil reservoir at its lower end, a central air inlet tube terminating in the reservoir spaced from the bottom of the casing, an oil cup having a bottom wall between the end of the inlet tube and the bottom of the casing and an upwardly extending side wall between the air inlet tube and the casing wall, said oil cup having an opening at the bottom for the inlet of oil and extending upwardly above the operating oil lever in the reservoir, a plurality of annular baffles mounted in the space between the inlet tube and the casing wall, said baffles being arched upwardly intermediate the tube and the casing and being formed with a plurality of radial slits and turned-over portions adjacent to the slits to effect liquid conveying channels protected from the air stream flowing through the casing and extending downwardly toward the tube and the casing whereby liquid collected by the baffles is delivered both to the said tube and to said wall.

6. An air cleaner comprising a cylindrical casing having an oil reservoir at its lower end, a central air inlet tube terminating in the reservoir spaced from the bottom of the casing, an oil cup having a bottom wall between the end of the inlet tube and the bottom of the casing and an upwardly extending side wall between the air inlet tube and the casing wall, said oil cup having an opening at the bottom of the inlet of oil and extending upwardly above the operating oil level in the reservoir, a plurality of annular baffles mounted in the space between the inlet tube and the casing wall, said baffles being arched upwardly intermediate the tube and the casing and being formed with liquid conveying channels extending downwardly toward the tube and the casing whereby liquid collected by the baffles is delivered both to the said tube and to said wall, and said baffles being provided with edge portions spaced from the inlet tube and the casing wall at intervals to provide passages for the return flow of oil.

RUSSEL D. ACTON.